(12) United States Patent
Dzuban

(10) Patent No.: US 6,421,441 B1
(45) Date of Patent: Jul. 16, 2002

(54) METHOD AND TELEPHONE NETWORK FOR SWITCHING TELEPHONE CONNECTIONS

(75) Inventor: Stanislav Dzuban, Vienna (AT)

(73) Assignee: Siemens Aktiengesellschaft (DE)

(*) Notice: Subject to any disclaimer, the term of this patent is extended or adjusted under 35 U.S.C. 154(b) by 0 days.

(21) Appl. No.: 09/297,211

(22) PCT Filed: Oct. 28, 1997

(86) PCT No.: PCT/DE97/02504

§ 371 (c)(1),
(2), (4) Date: Apr. 27, 1999

(87) PCT Pub. No.: WO98/19484

PCT Pub. Date: May 7, 1998

(30) Foreign Application Priority Data

Oct. 28, 1996 (DE) .......................................... 196 44 792

(51) Int. Cl.[7] .............................................. H04M 7/00
(52) U.S. Cl. .................. 379/221.09; 455/406; 455/456
(58) Field of Search ............................ 349/211.01, 245, 349/246, 221.09; 379/230, 201.98; 455/406, 456

(56) References Cited

U.S. PATENT DOCUMENTS 6,163,597 A * 12/2000 Voit ......................... 379/93.17

* cited by examiner

*Primary Examiner*—Creighton Smith
(74) *Attorney, Agent, or Firm*—Morrison & Foerster, LLP

(57) ABSTRACT

A telephone network wherein a subscriber data register (TND) is provided in an exchange (UAT, ZAT) for each subscriber (TN1, TN2) allocated thereto and an intelligent services controller (SCP) is allocated to the originating and/or destination office, whereby a coordinate register (GKR) that contains the geographical coordinates of the subscriber line is additionally provided in the exchange (UAT, ZAT) for each subscriber line (TN1, TN2), and the exchange is configured for fetching the coordinates of the calling or called subscriber from the coordinate register given every outgoing and/or arriving call and for making these coordinates together with the subscriber data and other call data available to an intelligent services controller (SCP) allocated to it and/or for forwarding these in the network for further employment by another exchange and an intelligent services controller allocated to it.

26 Claims, 4 Drawing Sheets

METHOD AND TELEPHONE NETWORK FOR SWITCHING TELEPHONE CONNECTIONS

The invention is directed to a method and to a telephone network according to the preamble of patent claim 1 or, respectively, of patent claim 12.

The present invention is directed to a method for switching telephone connections and to a telephone network for switching telephone connections according to the method.

Modem telecommunication services or network operators offer their customers more and more supplementary services that are intelligently administered. The geographical coordinates of a subscriber is information that is of significance for such supplementary services in many cases. In a number of important services, such as those performed by taxicabs, service trucks, plumbers, etc., it is necessary or at least advantageous to know the location of the subscriber. Whereas the geographical coordinates of the subscribers already represent an important information source in for example, mobile radiotelephone, particularly in the GSM network here, this information was hitherto not made available in a useable way in a fixed network. The reason for this is that only a rough geographical position, for example a neighborhood, can be derived from the telephone number of a subscriber in the numbering system that is typically employed. Since developments are proceeding such that a telephone number is no longer to always be allocated to a specific connection or telephone set that is always located, at a specific location but to the customer as a person, the previous informational content of the telephone number with respect to the geographical position, which is only limited anyway, is lost.

Further there is the tendency to pack a great deal of intelligent hardware and software into the terminal device ("cell phone") in mobile telephones of, for example, the GSM system, but to keep the complexity in the terminal devices low in devices of fixed networks, including cordless telephone systems of, for example, the DECT systems and to instead integrate the majority of the intelligence into the network.

Service controllers (service control points) are employed in order to offer customized services faster. These service controllers are potentially centralized or decentralized and are described in the following recommendations of the International Telecommunication Union: ITU-T Recommendation Q. 1215 (03/93), General recommendations on telephone switching and signaling, Intelligent Network, "Physical Plane for Intelligent Network CS-1", pages 1–8.

Canadian Patent Number CA-A-2 160 278—to which U.S. Pat. No. 5,727,057 corresponds, discloses a method for storage, transmission and communication of geographical position data in a telephone network that is supplied by a GPS satellite navigation system (Global Positioning System). The telephone network thereby comprises a switching system that is fashioned for switching the telephone connections dependent on the nature of the telephone network—for example as central office for a public switched telephone network (PSTN) or as service control point (SCP) for an intelligent network (IN). A number of data banks are arranged offset from the switching system in order to store individual subscriber data, routing information and other data. The other data also includes the GPS position data that indicates the geographical position of the subscriber terminal devices and acts as location information (location ID). Telephone numbers (telephone ID) are unambiguously allocated to the subscriber terminal devices according to a static numbering plan of the telephone network. Services can be utilized for various subscribers—for example, mobile subscribers of a cellular mobile radiotelephone network and stationary subscribers of a wire-bound telephone network—in that queries of the data banks ensue on the basis of either the location information or the telephone number or a combination of both identities.

SUMMARY OF THE INVENTION

The present invention provides a method and a telephone network that enables an improved control of the switching of telephone connections.

Proceeding from the storing of subscriber data in an office to which a service control point is allocated, geographical coordinates for each of the subscriber lines serviced by the office are stored in a coordinate register in the respective office that is arranged therein in addition to a subscriber data register, the geographical coordinates are called given every outgoing and incoming connection in the office and are made available to the service control point together with at least the subscriber data, and the further connection sequence in view of the switching of the connection is controlled dependent on the geographical coordinates received by the service control point.

The present invention provides an additional coordinate system in the exchanges, thus only an adaptation of the signaling system is required for the transmission of the geographical coordinates but does no additional hardware or software is required at the subscriber devices. The additional benefit resulting from the invention thus becomes accessible to all subscribers without additional outlay. Precisely due to the integration of an additional coordinate register into the respective office, the coordinate system is created at the office-side and not at the device-side. The compact and internal arrangement of a coordinate register in addition to the subscriber data register in the respective office effects a low signaling outlay deriving only due to internal communication, for example by automatically attaching a coordinate signal to the standard ringing signal.

In accordance with the invention, it is advantageous that geographical coordinates are compared to geographical comparison coordinates that the service control point stores in lists. In a preferred embodiment, the intelligent services controller conducts modified selection data to the exchange dependent on the result of the comparison.

In another embodiment of the invention, the subscribers can be mobile subscribers whose current geographical coordinates are available to the service control point. Alternatively thereto, the subscribers can be users of cordless telephones in cells of a cordless system whose geographical coordinates are made available to the service control point.

It is expedient when the service control point allows or excludes connections dependent on the geographical coordinates. The geographical coordinates can also be advantageously forwarded to a destination office or a transit office and/or an originating office.

It has likewise proven beneficial when, dependent on the geographical coordinates, a stored announcement is played before the connection setup or instead of setting up a connection or a call forwarding is implemented. Over and above this, one or more switching-oriented events of the connection setup can be activated for the service control point dependent on the geographical coordinates or the subscriber can be connected to an operator.

DESCRIPTION OF THE PRESENTLY PREFERRED EMBODIMENTS

Figure 1:
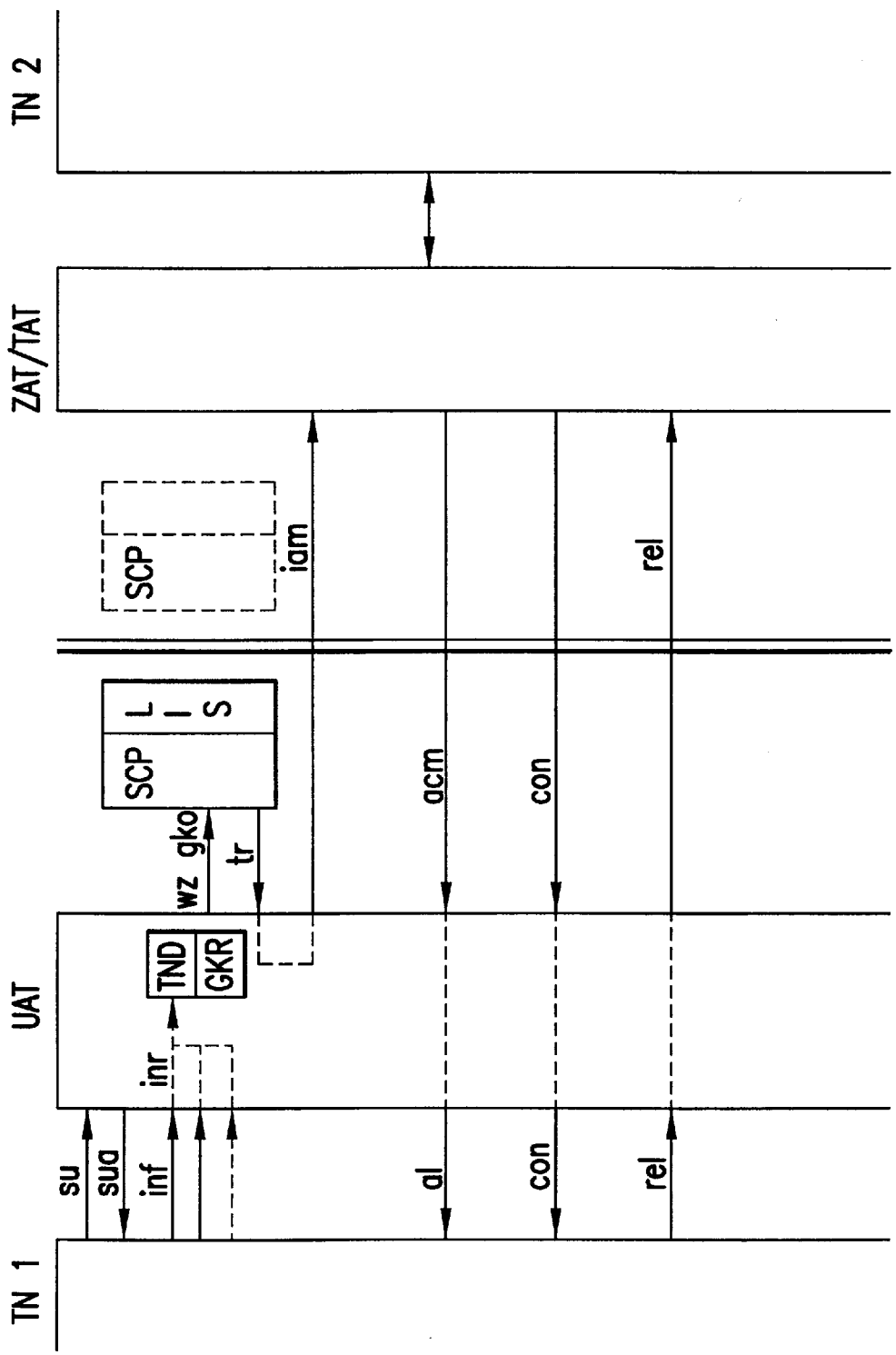
FIG. 1 is a schematic illustration of a connection sequence in a telephone network constructed and operated in accordance with the invention.

FIG. 1 shows an originating exchange UAT as well as a destination exchange ZAT/TAT that can also be a transit exchange. Only the terms "originating exchange" or "destination exchange" are recited below, but it should be made clear that a transit exchange can also always be meant. A first subscriber TN1 in the telephone network belongs to the originating exchange UAT, whereas a second subscriber TN2 belongs to the destination exchange ZAT. An intelligent services controller SCP is allocated to the originating exchange UAT. The intelligent services controller SCP can lie in the originating exchange UAT or be centralized. An intelligent services controller SCP, as indicated by broken lines in FIG. 1, can likewise be allocated to the destination exchange ZAT. Such services controllers SCP, often referred to as "intelligent networks" are known and contain the required hardware or software to "intelligently" administer or, respectively, switch calls.

A subscriber data register TND and a coordinate register GKR, which is critical to the invention, are located in the originating exchange UAT. Important data relating to the various subscribers of the exchange UAT and to access possibilities, authorizations of the subscribers, etc., stored in the subscriber data register TND, and the geographical coordinates of every subscriber line stored in the coordinate resister GKR. Expediently, a format that is compatible with or, respectively, the same as other networks, particularly mobile radiotelephone networks, is selected here, to which end the reference Draft GSM 03.32 that was cited above is referenced, this relating to the geographical position description in the GSM system.

The executive sequences in the inventive method or in an inventive telephone network are described in FIG. 1, first spatially (left/right) and then temporally (from top to bottom). A setup signal su proceeds from the subscriber TN1 to the exchange UAT, which then returns a setup acknowledge signal sua to the subscriber. The information signals inf, particularly the selection digits, then proceed to the exchange UAT, which subsequently sends an information inquiry signal in to the subscriber data register TND. The geographical coordinates from the coordinate register GKR are then attached to the arriving information, and a selection digit and coordinate signal wz, gko is sent to the intelligent services controller SCP. Dependent on the geographical coordinates from the coordinate register GKR that are communicated to it, the s services controller SCP then forwards a signal tr, which contains the translated data, to the originating exchange UAT. Various criteria that are taken into consideration in the intelligent services controller SCP are listed in greater detail below. For example, the services controller SCP can contain a list LIS in which comparison coordinates that are critical for further decisions are stored. After receiving the signal tr, the originating exchange UAT then forwards an initial address signal iam to the destination exchange ZAT. After complete reception of the information of the signal iam, the destination exchange ZAT acknowledges this with an "address complete" signal acm to the originating exchange UAT that then forwards a ringing signal al to the subscriber TN1. Next, a through-connect signal con ensues from the destination exchange ZAT via the originating exchange UAT to the subscriber TN1. Finally, the connection setup is ended by a release signal rel on the part of the subscriber TN1 via the originating exchange UAT to the destination exchange ZAT.

Figure 2:
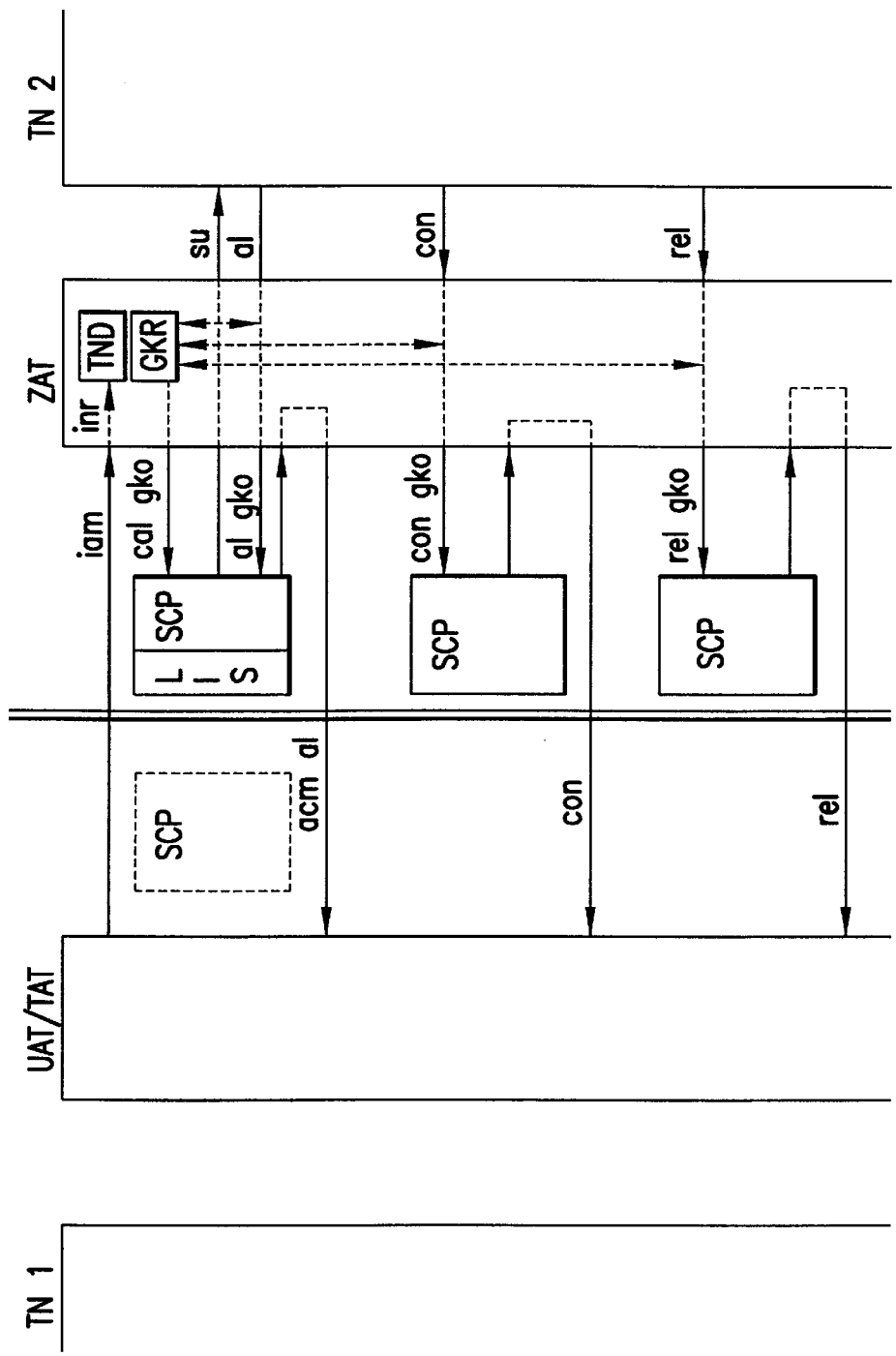
FIG. 2 is a schematic illustration of a connection sequence in a network constructed and operated in accordance with the invention.

FIG. 2 explains the basic function of the method and of the network according to the invention in greater detail for connections incoming in the destination exchange ZAT. A connection begins with the initial address signal iam that proceeds from the exchange UAT to the destination exchange ZAT. With an information inquiry signal inr, the subscriber data register TND is subsequently interrogated therein, whereby the subscriber data are checked, for example, for access possibilities, authorization of the subscriber, etc. At the same time, the geographical coordinates of the subscriber TN2 stored in the coordinate register GKR allocated to the register TND are attached to the existing information and offered for further processing. A call and coordinate signal cal, gko proceeds from the registers TND and GKR to an intelligent services controller SCP. In this case, too, the intelligent services controller SCP controls the further executive sequence of the connection dependent on the geographical coordinates of the called subscriber TN2. For example, it is possible that the user of a DECT cordless telephone may not wish to be reachable in certain radio cells of the DECT system and such corresponding information is available to the services controller. In this case, the geographical coordinates of those cells that are excluded from a connection or of those wherein a connection should be allowed are then present.

Figure 3:
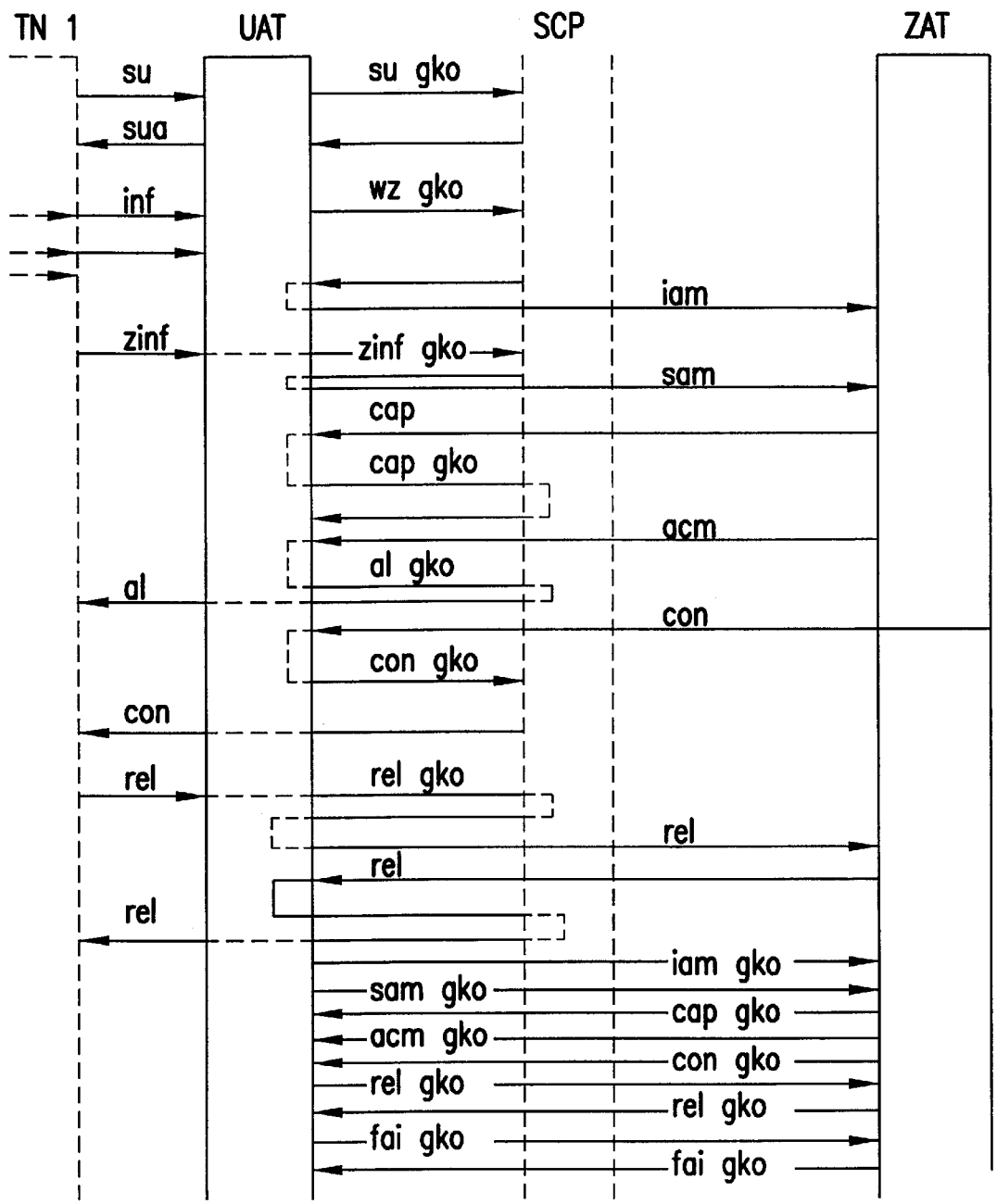
FIG. 3 is a schematic illustration of further connection and signal sequences in a telephone network constructed and operated in accordance with the invention.

During the further executive sequence, a setup signal su then proceeds from the services controller SCP via the exchange ZAT to the subscriber TN2. A ringing signal al of the subscriber TN2 can also be provided with geographical coordinates in the destination exchange ZAT, can be processed as ring and coordinate signal al, gko in the services controller SCP, and can then proceed to the originating exchange UAT as "address complete" mincing signal acm, al. The same applies analogously to a through-connect signal con that is supplemented with geographical coordinates by the second subscriber TN2 in the destination exchange ZAT, whereby this combined signal con, gko is then processed in the services controller SCP. The result thereof is that a through-connect signal con then proceeds from the destination exchange ZAT to the originating exchan-e UAT. The same also applies to the release signal rel that proceeds from the subscriber TN2 to the destination office ZAT. As indicated with arrows in FIG. 2, in the present examples, a supplementation of this signal by the geographical coordinates of the subscriber and a forwarding of this combined signal rel, gko to the services controller SCP ensues, this ultimately initiating a release signal that proceeds to the originating exchange UAT. The principle of every intelligent services controller SCP is comprised therein that it can modify the entire executive sequence and the connection setup and clear down, whereby this ensues with the assistance of the geographical coordinates of the subscribers within the framework of the invention. Further possibilities in this context are shown in FIG. 3. These further possibilities are recited below in listed form.

A setup signal su of a first subscriber TN1 is provided with geographical coordinates in the originating exchange UAT and proceeds as combined signal su, gko to the services controller SCP, returns to the originating exchange UAT correspondingly modified and then returns to the first subscriber TN1 as setup acknowledgment signal sua.

Selection information inf of the first subscriber TN1, which was previously described is provided with geographical coordinates in the originating exchange UAT and, after a digit analysis in the originating exchange UAT, then proceed as first address signal iam to the destination exchange ZAT. Further information on the part of the first subscriber TN1 proceeds as signal zinf to the originating exchange UAT, is provided with geographical coordinates therein and proceed as signal zinf, gko to the services controller SCP, returns to the originating exchange UAT after processing, and then proceeds therefrom to the destination exchange ZAT as information supplement signal sam.

A call progress signal cap comes from the destination exchange ZAT to the originating exchange UAT, is provided therein with the geographical coordinates of the first subscriber TN1, so that it proceeds as signal cap, gko to the intelligent services controller SCP and returns therefrom to the originating exchange UAT. This signal can be further-processed in the originating exchange UAT.

An "address complete" signal acm comes from the destination exchange ZAT to the originating exchange UAT, is provided therein with geographical coordinates, so that it proceeds as ringing coordinate signal al, gko to the services controller SCP, proceeds therefrom back to the originating exchange UAT after processing and, finally, proceeds to the first subscriber TN1 as ringing signal al.

A through-connect signal con comes from the destination exchange ZAT to the originating exchange UAT, is provided therein with geographical coordinates, so that it proceeds as combined signal con, gko to the services controller SCP and returns therefrom to the originating exchange UAT where it departs to the first subscriber TN1 as connect signal con. After a call that has occurred, a release signal rel can come from the first subscriber TN1 to the originating exchange UAT, be provided with geographical coordinates therein, so that it proceeds as combined signal rel, gko to the services controller SCP, is returned therefrom to the originating exchange UAT and returns therefrom to the destination exchange ZAT as release signal rel.

Conversely, a release signal rel can then proceed from the destination exchange ZAT to the originating exchange UAT, be provided with geographical coordinates therein, so that it proceeds as combined signal rel, gko to the intelligent services controller SCP, where it returns after processing to the originating exchange UAT and is finally forwarded to the first subscriber as release signal rel.

What is understood by additional information that can be contained in the aforementioned signal zinf is fundamentally all information that proceeds beyond the pure selection signal (selection digits). For example, the intelligent services controller SCP can assume the function in accord wherewith, for example in DECT systems, certain numbers of certain cells are selected or dare not be selected. Thus, it is possible that specific foreign telephone numbers could be selected by certain "geographical" locations within a company but not if the DECT cordless telephone is in other cells, for example outside the company building. In this case, a selection block of such numbers ensues in accordance with the invention. The geographical coordinates thus interact with the intelligent services controller SCP that draws various conclusions from the geographical coordinates that are responsible for the further executive sequence.

In conjunction with, for example, the DECT (Digital European Cordless Telecommunication) system, the coordinate register in an exchange can always remain unmodified according to the invention but a different number allocation can ensue. In the DECT system, the base device of every cell, of course, has different geographical co-ordinates, and the allocation of the subscriber numbers ensues via the DECT data banks.

The aforementioned service signal (call progress) cap can, for example, be a message that the subscriber would prefer not to be reached. This message is supplied to the originating exchange UAT and, ultimately, to the services controller SCP, and, together with the geographical coordinates of the calling subscriber, is available as information to the services controller SCP that can undertake further actions.

Quite generally, the intelligent services controller SCP should enable a faster execution of the procedures, and the originating exchange UAT can inquire over and over again at the services controller SCP as to what should occur given every incoming signaling event. This also applies when the "address complete" message arrives, which, as indicated above, can likewise be linked with the geographical coordinates. The same is also true of the other signals presented above, so that the intelligent services controller SCP can use the geographical coordinates during the entire call execution from the connection setup up to the conclusion thereof.

All combinations of the presentations disclosed above are also possible within the scope of the invention. In particular, the geographical coordinates of both the calling as well as of the called (first, second) subscribers can be involved in the control process. An intelligent services controller SCP can be available to the originating exchange UAT or to the destination exchange ZAT; however, corresponding intelligent services controllers SCP can likewise be present for each exchange, regardless of whether these are centrally placed or are directly allocated to the exchange.

FIG. 3, at the bottom, shows farther information that can proceed from the originating exchange UAT to the destination exchange ZAT or vice versa, namely combined signals such as first address plus coordinate signal iam, gko, information supplement signal plus coordinate signal sam, gko, release signal plus coordinate signal rel, gko, call progress plus coordinate signal cap, gko, through-connect plus coordinate signal con, gko, "address complete" plus coordinate signal acm, gko and error signal plus coordinate signal fai, gko. As was presented with reference to a few signals in FIG. 2, all of these signals can likewise be provided with geographical coordinates in the destination exchange ZAT and can be sent for processing to the services controller SCP allocated to the destination exchange ZAT.

Figure 4:
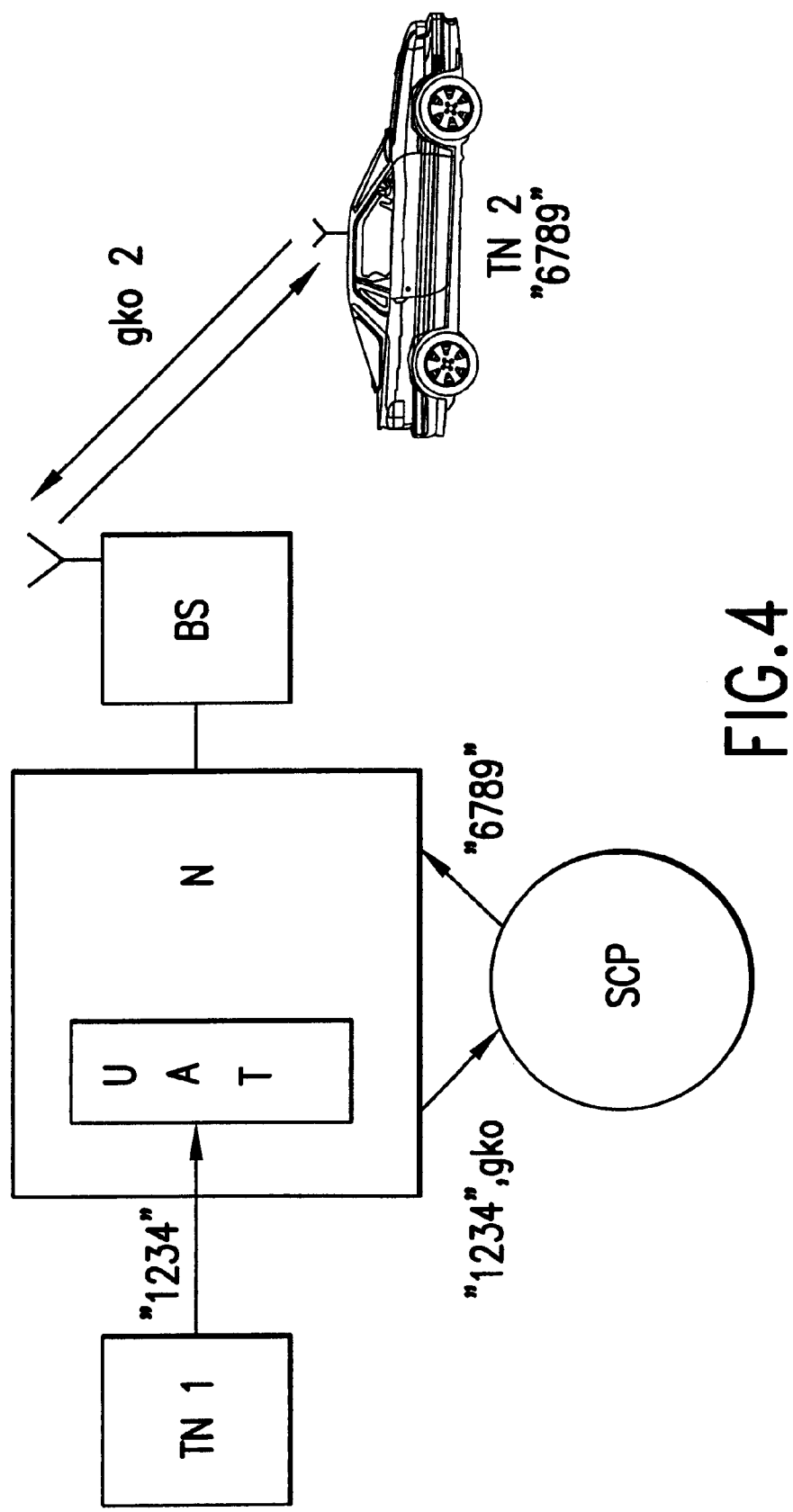
FIG. 4 is a block diagram of the switching from a fixed subscriber to a mobile subscriber who in turn discloses his coordinates in accordance with the present invention.

FIG. 4 illustrates one of the many possible, practical examples within the scope of the invention. A subscriber TN1 who belongs to an originating exchange UAT selects a number "1234" that is provided with geographical coordinates gko I in the originating exchange UAT. From there or quite generally from the network N, the combined signal 1234, gok1 proceeds to an intelligent services controller SCP.

In this example, it is assumed that the subscriber TN1 has called a rental car agency under the telephone number "1234" in order to order a rental car. Such a rental car, indicated here as TN2, continuously forwards its geographical coordinates gko2 that, for example, it identifies with the assistance of a satellite navigation system to the network N via a radio base station BS. These geographical coordinates are then also available to the intelligent services controller SCP that now searches for the currently closest rental car among the possible rental cars on the basis of a comparison in a stored list, and, on its own, selects the telephone number "6789" of this subscriber TN2 or rental car, so that the subscriber TN1 is ultimately fully automatically connected to the closest rental car.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A method for switching telephone connections of a subscriber comprising:

storing subscriber data in an exchange allocated to said subscriber;

administering outgoing and incoming calls with a service control point allocated to said exchange;

storing geographical coordinates for each subscriber serviced by said exchange in a coordinate register in said particular exchange and in a subscriber data register;

calling said geographical coordinates for every call in at least one set of calls selected from the group of call sets consisting of outgoing calls and incoming calls in said exchange; and transmitting said geographical coordinates to said service control point together with at least said subscriber data; and wherein further connection sequences in view of said call switching is controlled dependent on said geographical coordinates received by said service control point.

2. The method according to claim 1, wherein said geographical coordinates are compared to geographical comparison coordinates that said service control point stores in lists.

3. The method according to claim 2, wherein modified selection data is conducted from said service control point to said exchange dependent on a result of said comparison.

4. The method according to claim 1, wherein said subscribers are mobile subscribers whose current geographical coordinates are available to said service control point.

5. The method according to claim 1, wherein said subscribers are users of cordless telephones in cells of a cordless system, and wherein said the geographical coordinates of said subscribers are made available to said service control point.

6. The method according to claim 1, wherein said service control point allows connections and excludes connections dependent on said geographical coordinates.

7. The method according to claim 1, wherein said geographical coordinates are forwarded to a destination exchange.

8. The method according to claim 1, wherein said geographical coordinates are forwarded to an originating exchange.

9. The method according to claim 1, wherein a stored announcement is output dependent on said geographical coordinates, and wherein said announcement is output before said connection setup.

10. The method according to claim 1, wherein a call forwarding ensues dependent on said geographical coordinates.

11. The method according to claim 1, wherein said subscriber is connected to an operator dependent on said geographical coordinates.

12. A telephone network for switching telephone connections of a subscriber comprising:

a subscriber data register arranged in an exchange for storing subscriber data;

a service control point allocated to said exchange for administration of outgoing and incoming connections;

a coordinate register for storing geographical coordinates for each subscriber serviced by said exchange arranged in said exchange;

said exchange fetching said geographical coordinates for every call in at least one set of calls selected from the group of call sets consisting of outgoing calls and incoming calls and to transmit said geographical coordinates together with at least said subscriber data to said service control point; and wherein said service control point is configured for controlling further connection sequences in view of a switching of said further connection dependent on received geographical coordinates.

13. A telephone network according to claim 12, wherein said service control point comprises list with comparison geographical coordinates for comparison with said geographical coordinates.

14. A telephone network according to claim 12, wherein said service control point is configured for receiving current geographical coordinates from mobile subscribers.

15. A telephone network according to claim 12, wherein said service control point is configured for receiving geographical coordinates from users of cordless telephones that are located in cells of a cordless system.

16. A telephone network according to claim 12, wherein said exchange is a destination exchange for reception of said geographical coordinates.

17. A telephone network according to claim 12, wherein said exchange is an originating exchange for reception of said geographical coordinates.

18. A method according to claim 1, wherein said geographical coordinates are forwarded to a transit exchange.

19. A method according to claim 1, wherein a stored announcement is output dependent on said geographical coordinates, and wherein said announcement is output instead of setting up a connection.

20. A telephone network according to claim 12, wherein said exchange is a transit exchange for reception of said geographical coordinates.

21. Telephone network according to one of the claims 14 through 20, characterized in that the intelligent services controller (SCP) is configured for allowing specific connections but not allowing others dependent on the geographical coordinates of a calling and/or called subscriber.

22. Telephone network according to one of the claims 14 through 21, characterized in that each exchange (UAT, ZAT) is configured for forwarding the geographical coordinates of one of its calling subscribers to a destination or, respectively, transit exchange.

23. Telephone network according to one of the claims 14 through 22, characterized in that the intelligent services controller (SCP) and the exchange (UAT, ZAT) are configured for playing a stored announcement dependent on the geographical coordinates of a subscriber (TN1, TN2) before the connection setup or instead of setting up a connection.

24. Telephone network according to one of the claims 14 through 23, characterized in that the intelligent services controller (SCP) and the office (UAT, ZAT) are configured for implementing a call forwarding dependent on the geographical coordinates of a subscriber (TN1, TN2).

25. Telephone network according to one of the claims 14 through 24, characterized in that the intelligent services controller (SCP) and the exchange (UAT, ZAT) are configured for connecting a subscriber to an operator dependent on the geographical coordinates of a subscriber (TN1, TN2).

26. Telephone network according to one of the claims 14 through 25, characterized in that the intelligent services controller (SCP) and the exchange (UAT, ZAT) are configured for activating one or more switching-oriented events of the connection setup such as, for example, ringing at the called subscriber, refusing the call, releasing the call, etc., for the further intelligent services controller dependent on the geographical coordinates of a subscriber (TN1, TN2).

* * * * *